(12) United States Patent     (10) Patent No.: US 12,647,817 B2

Wu et al.     (45) Date of Patent: Jun. 2, 2026

---

(54) METHODS AND APPARATUSES FOR DUPLICATION COMMUNICATION

(71) Applicant: LENOVO (BEIJING) LIMITED, Beijing (CN)

(72) Inventors: Lianhai Wu, Beijing (CN); Joachim Lohr, Wiesbaden (DE); Prateek Basu Mallick, Dreieich (DE); Haiming Wang, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 688 days.

(21) Appl. No.: 17/436,982

(22) PCT Filed: Mar. 28, 2019

(86) PCT No.: PCT/CN2019/080141

§ 371 (c)(1),
(2) Date: Sep. 7, 2021

(87) PCT Pub. No.: WO2020/191723

PCT Pub. Date: Oct. 1, 2020

(65) Prior Publication Data

US 2022/0174535 A1    Jun. 2, 2022

(51) Int. Cl.
   *H04W 88/14*      (2009.01)
   *H04W 28/02*      (2009.01)

(52) U.S. Cl.
   CPC ... *H04W 28/0263* (2013.01); *H04W 28/0236* (2013.01); *H04W 28/0257* (2013.01); *H04W 88/14* (2013.01)

(58) Field of Classification Search
   CPC ......... H04W 28/0263; H04W 28/0236; H04W 28/0257; H04W 88/14; H04W 24/02;
           (Continued)

(56) References Cited

U.S. PATENT DOCUMENTS

2016/0094446 A1*   3/2016   Kazmi ............. H04W 28/0289
                                          370/392
2016/0249259 A1*   8/2016   Park .................. H04W 36/0069
                    (Continued)

FOREIGN PATENT DOCUMENTS

CN       102098723 A     6/2011
CN       107342851 A    11/2017
                  (Continued)

OTHER PUBLICATIONS

International Searching Authority, "Written Opinion of the International Searching Authority," PCT/CN2019/080141, Dec. 27, 2019, pp. 1-4.

*Primary Examiner* — Jay P Patel
*Assistant Examiner* — Shehab A Alawdi
(74) *Attorney, Agent, or Firm* — Kunzler Needham & Hilton

(57) ABSTRACT

Embodiments of the present disclosure relate to methods and apparatuses for duplication communication. According to an embodiment of the present disclosure, a method includes: receiving configuration information associated with duplication for data radio bearer (DRB) between a terminate node and a donor node; and in response to the duplication for data radio bearer being activated, transmitting a set of original packets and a set of duplicate packets in up link. Embodiments of the present disclosure solve issues about applying a DRB duplication mechanism in an integrated access and backhaul (IAB) system, which can improve and facilitate the implementation of the IAB system.

17 Claims, 12 Drawing Sheets

(58) Field of Classification Search
CPC ... H04W 76/15; H04W 84/047; H04W 84/22;
H04L 1/08
See application file for complete search history.

(56) References Cited

U.S. PATENT DOCUMENTS

| | | | | |
|---|---|---|---|---|
| 2017/0331577 | A1* | 11/2017 | Parkvall | ................. H04W 4/00 |
| 2018/0098250 | A1 | 4/2018 | Vrzic et al. | |
| 2018/0324642 | A1 | 11/2018 | Yu et al. | |
| 2018/0332501 | A1* | 11/2018 | Tseng | ........................ H04L 1/08 |
| 2019/0082363 | A1* | 3/2019 | Park | ................. H04W 36/0079 |
| 2019/0109823 | A1* | 4/2019 | Qiao | ................ H04M 15/8228 |
| 2019/0253941 | A1* | 8/2019 | Cirik | ................ H04W 36/0069 |
| 2019/0297529 | A1* | 9/2019 | Hampel | ................ H04W 80/02 |
| 2019/0349139 | A1* | 11/2019 | Park | ........................ H04L 1/189 |
| 2019/0349834 | A1* | 11/2019 | Teyeb | .................. H04W 84/18 |
| 2019/0357292 | A1* | 11/2019 | Cirik | .................... H04L 5/0053 |
| 2020/0099546 | A1* | 3/2020 | Haag | ................... H04L 41/0896 |
| 2020/0112953 | A1* | 4/2020 | Bendlin | .............. H04W 88/14 |
| 2021/0022040 | A1* | 1/2021 | Zhu | ....................... H04W 80/02 |
| 2021/0235291 | A1* | 7/2021 | Byun | .............. H04W 28/0236 |
| 2021/0352523 | A1* | 11/2021 | Wei | ....................... H04W 40/02 |

FOREIGN PATENT DOCUMENTS

| | | |
|---|---|---|
| CN | 109150388 A | 1/2019 |
| JP | 2011015317 A | 1/2011 |
| WO | 2018143600 A1 | 8/2018 |
| WO | 2018156074 A1 | 8/2018 |
| WO | 2018232724 A1 | 12/2018 |

* cited by examiner

Donor node                IAB node                    UE

Determining DRB associated
with received packet

Determining backhaul RLC
entity associated with
determined DRB

Delivering received packet to
corresponding PDCP entity

METHODS AND APPARATUSES FOR DUPLICATION COMMUNICATION

TECHNICAL FIELD

The present disclosure relates to wireless communications, and more particularly, to methods and apparatuses for duplication communication in an integrated access and backhaul (IAB) system.

BACKGROUND

In the 3rd Generation Partnership Project (3GPP), deployment of relay nodes (hereinafter referred to as "RNs") in a wireless communication system is promoted. One objective for deploying RNs is to enhance coverage area of a base station (hereinafter referred to as "BS") by improving the throughput of a mobile device (also known as a user equipment (UE)) that locates in a coverage hole or far from the BS resulting in low signal quality.

In a wireless communication system employing RNs, a BS that can provide connection to at least one RN is called a donor BS. An RN is connected to a donor BS by a backhaul link. The RN may hop through one or more RNs before reaching the donor BS, or may be directly connected to the donor BS. For the new radio (NR) communication networks, 3GPP is envisioning an integrated access and backhaul (IAB) architecture for supporting multi-hop relays, wherein a donor node with multi-connectivity is also supported by an IAB node. That is, the IAB node has a plurality of active routes to the donor BS via multiple parent IAB nodes (also called "serving IAB node"). A multi-hop network may provide more range extension than a single-hop network. This is especially beneficial for wireless communications at frequencies above 6 GHz which have limited ranges when using single-hop backhauling. Multi-hop backhauling further enables backhauling around obstacles, e.g., buildings in an urban environment for in-cluster deployments.

At the same time, the 3GPP also introduces a data radio bearer (DRB) duplication mechanism to increase reliability and reduce latency in wireless communications by transmitting a packet and its duplicate through two independent transmission paths, respectively. The packet can be a protocol data unit (PDU) of the Packet Data Convergence Protocol (PDCP) layer. This is especially beneficial for Ultra-Reliable and Low Latency Communications (URLLC) services provided by 5G New Radio (NR) system.

However, how to apply the duplication mechanism to the IAB system is a new challenge for the industry.

SUMMARY OF THE DISCLOSURE

An object of the embodiments of the present disclosure is to provide a method and apparatus for duplication communication, which can be used in an IAB system.

According to an embodiment of the present disclosure, a method includes: receiving configuration information associated with duplication for data radio bearer between a terminate node and a donor node; and in response to the duplication for data radio bearer being activated, transmitting a set of original packets and a set of duplicate packets in up link.

According to another embodiment of the present disclosure, a method includes: transmitting configuration information associated with duplication for data radio bearer between a terminate node and a donor node; and in response to the duplication for data radio bearer being activated, receiving a set of original packets and a set of duplicate packets in up link.

According to another embodiment of the present disclosure, an apparatus includes: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to any one of the above methods with the at least one receiver, the at least one transmitter and the at least one processor.

Embodiments of the present disclosure solve issues about applying a duplication mechanism in an IAB system, which can improve and facilitate the implementation of the IAB system.

BRIEF DESCRIPTION OF THE DRAWINGS

In order to describe the manner in which advantages and features of the present disclosure can be obtained, a description of the disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only forms in which the present disclosure may be practiced. It is to be understood that the same or equivalent functions may be accomplished by different embodiments that are intended to be encompassed within the spirit and scope of the present disclosure.

Figure 1A:
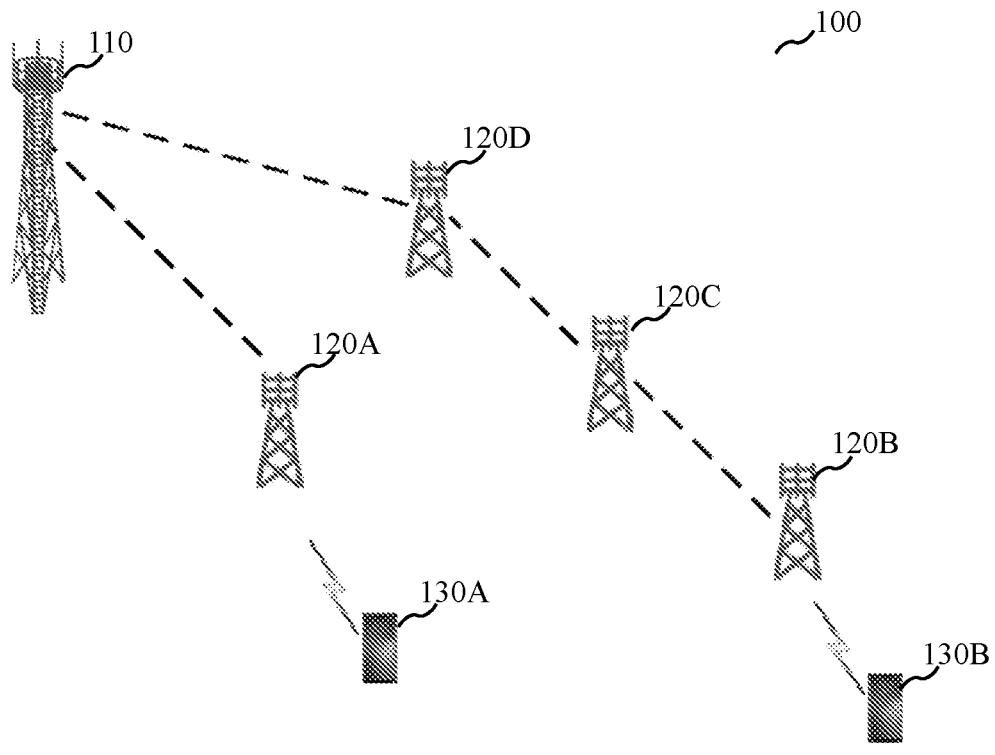
FIG. 1A illustrates an exemplary IAB system according to an embodiment of the present disclosure.

FIG. 1A illustrates an exemplary IAB system 100 according to an embodiment of the present disclosure.

Referring to FIG. 1A, it is assumed for simplicity that the IAB system 100 includes an IAB donor node (e.g., donor node 110), some IAB nodes (e.g., IAB node 120A, IAB node 120B, IAB node 120C, and IAB node 120D), and some UEs (e.g., UE 130A and UE 130B). Although merely, for simplicity, one donor node is illustrated in FIG. 1A, it is contemplated that IAB system 100 may include more donor node(s) in some embodiments of the present disclosure. Similarly, although merely four IAB nodes are illustrated in FIG. 1A for simplicity, it is contemplated that IAB system 100 may include more or fewer IAB nodes in some embodiments of the present disclosure. Although merely two UEs are illustrated in FIG. 1A for simplicity, it is contemplated that IAB system 100 may include more or fewer UEs in some embodiments of the present disclosure.

IAB node 120A and IAB node 120D are directly connected to donor node 110. IAB node 120A and IAB node 120D may be connected to different donor nodes in accordance with some other embodiments of the present disclosure.

IAB node 120C can reach donor node 110 by hopping through IAB node 120D. IAB node 120D is a parent IAB node of IAB node 120C. In other words, IAB node 120C is a child node of IAB node 120D. IAB node 120B can reach donor node 110 by hopping through IAB node 120C and IAB node 120D. IAB node 120C and IAB node 120D are upstream nodes of IAB node 120B, and IAB node 120C is a parent IAB node of IAB node 120B. In other words, IAB node 120B is the child node of IAB node 120C. IAB node 120B and IAB node 120C are downstream nodes of IAB node 120D. UE 130A is directly connected to IAB node 120A, and UE 130B is directly connected to IAB node 120B. In other words, UE 130A and UE 130B are served by IAB node 120A and IAB node 120B, respectively.

Each of IAB node 120A, IAB node 120B, IAB node 120C, and IAB node 120D may be directly connected to one or more UE(s) in accordance with some other embodiments of the present disclosure.

Each of IAB node 120A, IAB node 120B, IAB node 120C, and IAB node 120D may be directly connected to one or more IAB node(s) in accordance with some other embodiments of the present disclosure.

In the IAB system 100, which provides multi-hop relay, a wireless backhaul link may fail due to, for example but is not limited to, blockage by moving object(s) (e.g., vehicle(s)), foliage (caused by seasonal changes), new buildings (e.g., infrastructure changes). Such backhaul link failure may occur on a physically stationary IAB node or a mobile IAB node. Link switching technique has been developed to address this issue.

For example, assuming that a Radio Link Failure (RLF) occurs on the backhaul link between donor 110 and IAB node 120D, IAB node 120D may establish a link to another donor node (not shown). In other words, IAB node 120D may switch from the link between IAB node 120D and donor node 110 to a link between IAB node 120D and another donor node (not shown).

For example, assuming that an RLF occurs on the backhaul link between two IAB nodes (e.g., IAB node 120D and IAB node 120C), IAB node 120C may establish a link to another IAB node (e.g., IAB node 120A). In other words, IAB node 120C may switch from the link between IAB node 120C and IAB node 120D to a link between IAB node 120C and a candidate IAB node 120A.

Figure 1B:
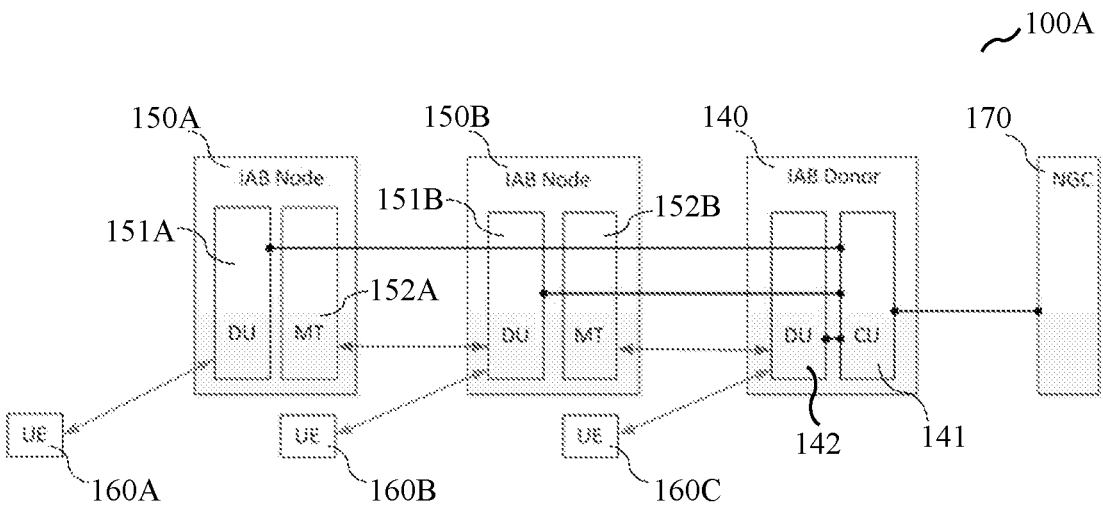
FIG. 1B illustrates an exemplary IAB system according to an embodiment of the present disclosure.

FIG. 1B illustrates an exemplary IAB system 100A according to an embodiment of the present disclosure.

Referring to FIG. 1B, the IAB system 100A may include IAB donor 140, IAB node 150A, IAB node 150B, UE 160A, UE 160B, UE 160C and a Next-Generation Core (NGC) 170.

Each of the IAB node 150A and IAB node 150B may include a Distributed Unit (DU) and a Mobile Termination (MT). In the context of this disclosure, MT is referred to as a function resided in an IAB node that terminates the radio interface layers of the backhaul Uu interface toward an IAB donor or other IAB nodes. The IAB nodes may be connected to an upstream IAB node or a BS (e.g., an IAB donor) via the MT function. The IAB nodes may be connected to UEs and a downstream IAB node via the DU.

IAB node 150A may be connected to an upstream IAB node 150B via MT 152A function. IAB node 150A may be connected to UE 160A via the DU 151A.

IAB node 150B may be connected to an upstream IAB node or IAB donor 140 via MT 152B function. IAB node 150B may be connected to UE 160B via DU 151B. IAB node 150B may be connected to downstream IAB node 150A via DU 151B.

In some embodiments of the present disclosure, IAB nodes as shown in FIG. 1B may include Layer-2 (L2) IAB nodes.

Referring back to FIG. 1A, the IAB nodes (e.g., IAB node 120A, IAB node 120B, IAB node 120C, and IAB node 120D) may include L2 IAB nodes.

Referring to FIG. 1B, the BS (e.g., IAB donor 140) may include at least one DU to support UEs and MTs of downstream IAB nodes. A Central Unit (CU) 141 included in the IAB donor 140 controls the DUs of all IAB nodes (e.g., IAB node 150A and IAB node 150B) and the DU(s) (e.g., DU 142) resided in the IAB donor 140. The DU(s) and the CU of an IAB donor may be co-located or may be located in different positions. The DU(s) and the CU of the IAB donor are connected via F1 interface. In other words, the F1 interface provides means for interconnecting the CU and the DU(s) of an IAB donor. The F1 Application Protocol (F1AP) supports the functions of F1 interface by certain F1AP signaling procedures.

In some embodiments of the present disclosure, CU 141 of the IAB donor 140 is a logical node hosting Radio Resource Control (RRC), Service Data Adaptation Protocol (SDAP) and PDCP layers of the BS. The DU of the BS is a logical node hosting Radio Link Control (RLC) layer, Medium Access Control (MAC) layer and Physical layer (PHY) of the BS. One cell is supported by only one DU of a BS or one DU of an IAB node.

Figure 2:
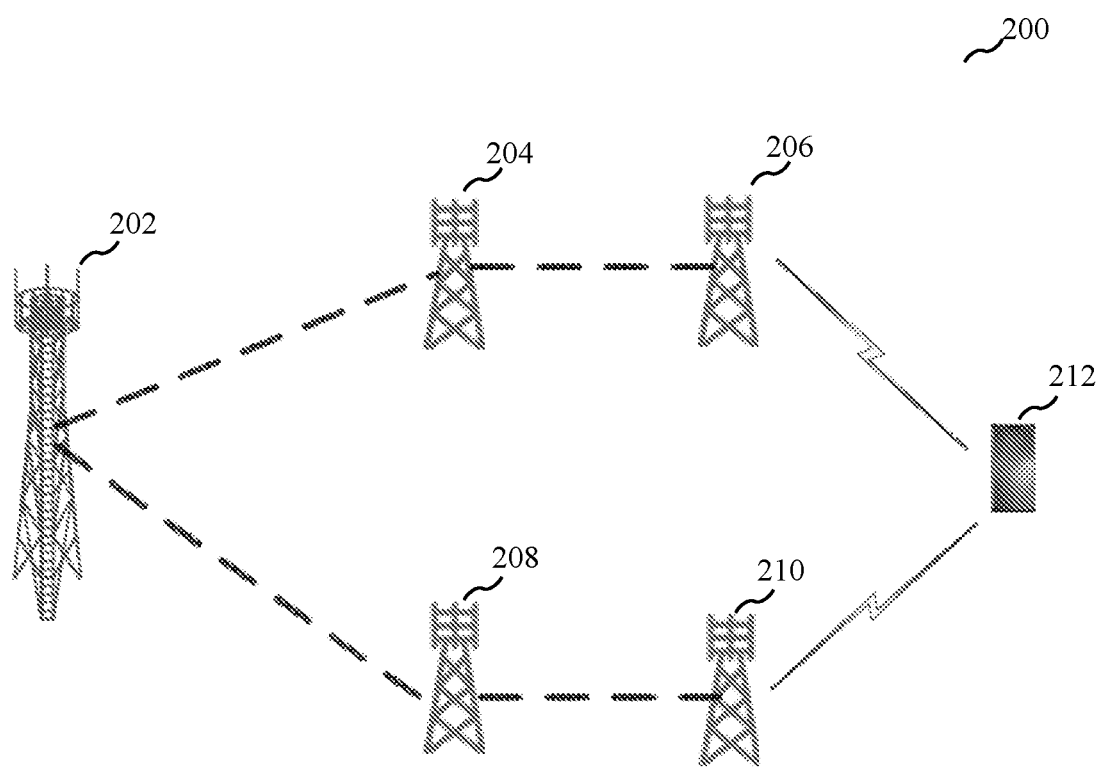
FIG. 2 illustrates an exemplary IAB system using duplication mechanism according to an embodiment of the present disclosure.

FIG. 2 illustrates an exemplary IAB system 200 where the duplication mechanism is applied according to an embodiment of the present disclosure. The introduced duplication mechanism can increase reliability and reduce latency in the IAB system 200.

As shown in FIG. 2, the exemplary IAB system 200 can include a donor node 202, a plurality of IAB nodes 204, 206, 208 and 210, and a UE 212. The UE 212 may communicate with the donor node 202 via a dual connectivity, for example, a first path by accessing IAB node 206, then to IAB node 204, and then to the donor node 202; and a second path by accessing IAB node 210, then to IAB node 208, and then to the donor node 202. Each of IAB node 206 and IAB node 210 can also be referred to as an "accessing node" of UE 212. Duplication for a DRB in uplink channels and duplication for a DRB in downlink channels may be established between donor node 202 and UE 212. For example, the first uplink DRB also referred to as "original DRB" or "primary DRB" is associated with IAB node 204 and IAB node 206, and the second uplink DRB as a duplicate of the first uplink DRB, also referred to as "duplicate DRB" or "secondary DRB" is associated with IAB node 208 and IAB node 210. A packet, for example a PDU, transmitted in the first uplink DRB is referred to as an "original packet" or "primary packet," for example an original PDU. The duplicate of the packet transmitted in the second uplink DRB is referred to as a "duplicate packet" or "secondary packet," for example a duplicate PDU. That is, the original packet is transmitted from UE 212 to donor node 202 through IAB node 206 and IAB node 204, and the duplicate packet is transmitted from UE 212 to donor node 202 through IAB node 210 and IAB node 208. In the case that donor node 202 receives both the original and duplicate packets, donor node 202 can discard one of them, for example the one which is received later. The duplication for DRB in downlink channels may be established in a similar way to the duplication for DRB in uplink channels. In another embodiment of the present disclosure, more than two duplications for uplink DRBs and downlink DRBs may be established.

Figure 3:
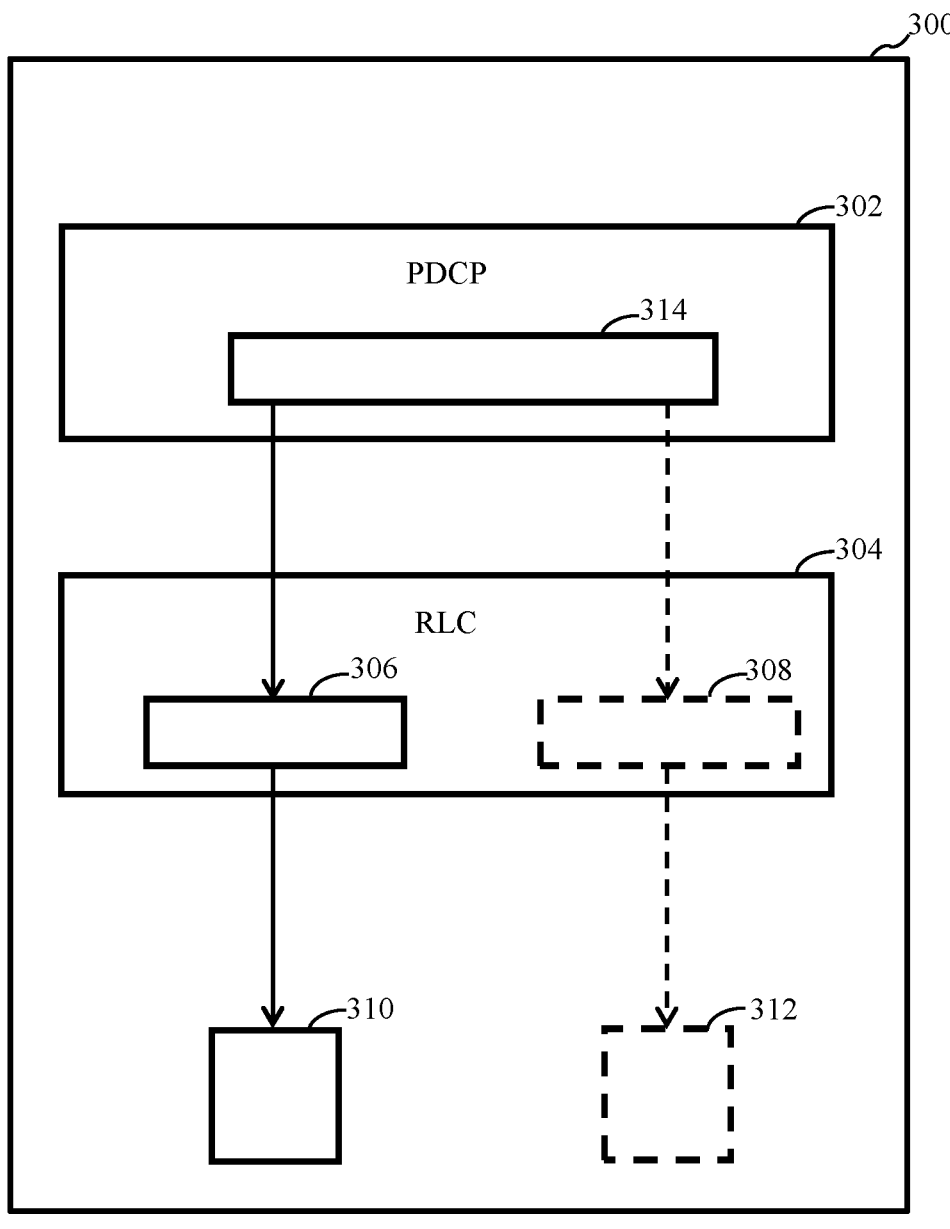
FIG. 3 illustrates an exemplary diagram of duplication in a transmitting apparatus according to an embodiment of the present disclosure.

FIG. 3 illustrates an exemplary diagram of PDCP duplication in a transmitting apparatus 300 according to an embodiment of the present disclosure. The transmitting apparatus 300 can be a UE according to an embodiment of the present disclosure, and can be configured with a PDCP layer 302 and a RLC layer 304. In the case that PDCP duplication is configured for packets in the PDCP layer 302, for example, PDUs, two RLC entities 306 and 308 can be established in RLC layer 304 of the transmitting apparatus 300. RLC entity 306 is configured to handle original PDUs, and RLC entity 308 is configured to handle duplicate PDUs. Logical channel 310 associated with RLC entity 306 and logical channel 312 associated with RLC entity 308 can be established respectively. Original PDUs are transferred from PDCP entity 314 in PDCP layer 302 to RLC entity 306, and then transmitted through logical channel 310. Duplicate PDUs are transferred from PDCP entity 314 to RLC entity 308, and then transmitted through logical channel 312. In some other embodiments, the transmitting apparatus 300 can be a donor node.

Figure 4:
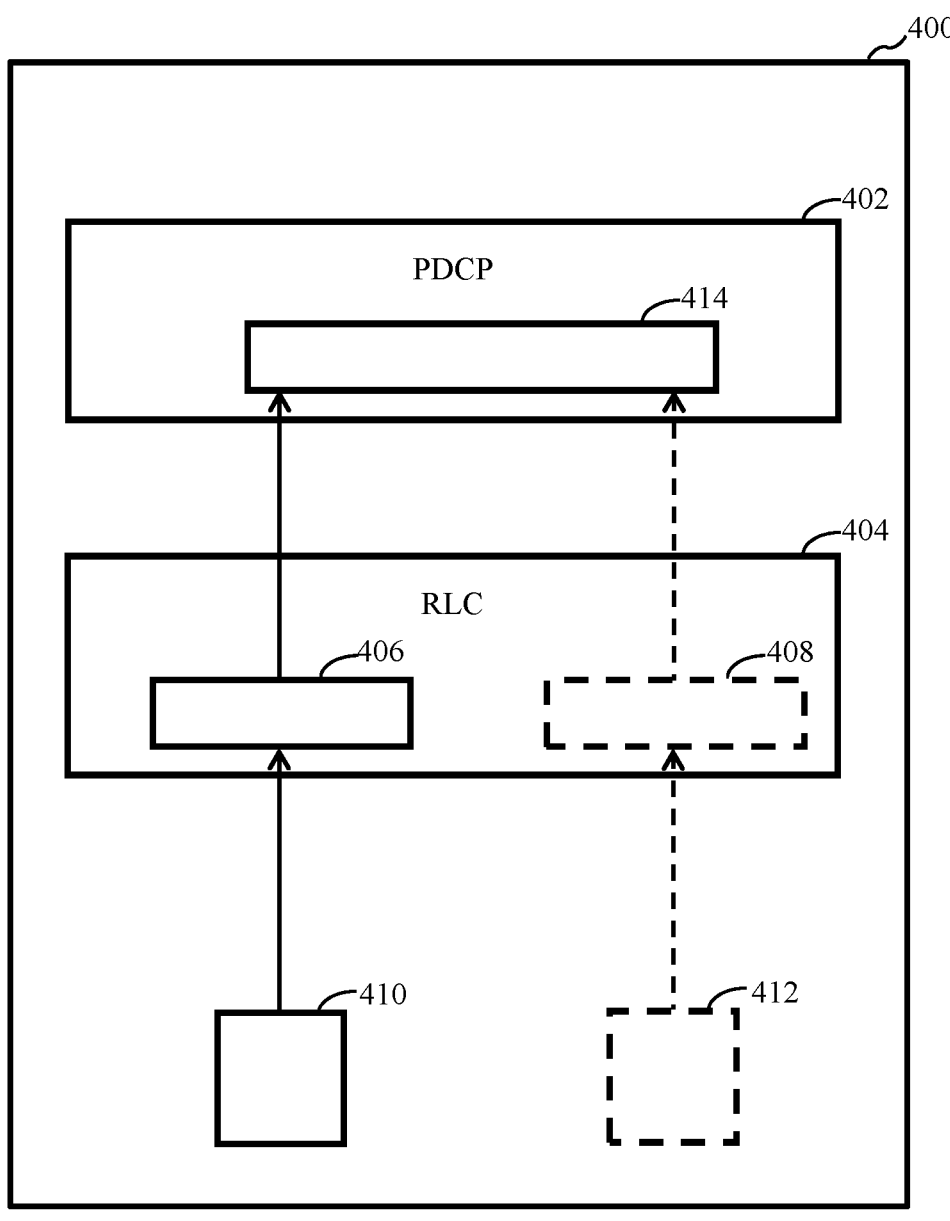
FIG. 4 illustrates an exemplary diagram of duplication in a receiving apparatus according to an embodiment of the present disclosure.

FIG. 4 illustrates an exemplary diagram of PDCP duplication in a receiving apparatus 400 according to an embodiment of the present disclosure. The receiving apparatus 400 can be a UE according to an embodiment of the present disclosure, and can be configured with a PDCP layer 402 and a RLC layer 404. In the case that PDCP duplication is configured for packets in the PDCP layer 402, for example, PDUs, two RLC entities 406 and 408 can be established in RLC layer 404 of the receiving apparatus 400. RLC entity 406 is configured to handle original PDUs, and RLC entity 408 is configured to handle duplicate PDUs. Logical channel 410 associated with RLC entity 406 and logical channel 412 associated with RLC entity 408 can be established respectively. RLC entity 406 receives original PDUs through logical channel 410 and transfers them to PDCP entity 414 in PDCP layer 402. RLC entity 408 receives duplicate PDUs through logical channel 412 and transferred them to PDCP entity 414. In the case that PDCP entity 414 receives both the original and duplicate PDUs, it can discard one of them, for example the one which is received lately. In some other embodiments of the present disclosure, the receiving apparatus 400 can be a donor node.

In an IAB system using a duplication mechanism, two typical communication scenarios need to be specifically considered. Below we will describe the two scenarios and corresponding duplication procedures according to embodiments of the present disclosure that may be adopted to resolve special issues in these scenarios.

Scenario 1: Duplication Communication Between a Donor Node and a UE

According to some embodiments of the present disclosure, in an exemplary scenario, duplication can be applied to DRB between a UE and a donor node. That is, the terminate node of the DRB is UE. Such scenario is referred to as scenario 1 hereinafter.

Figure 5:
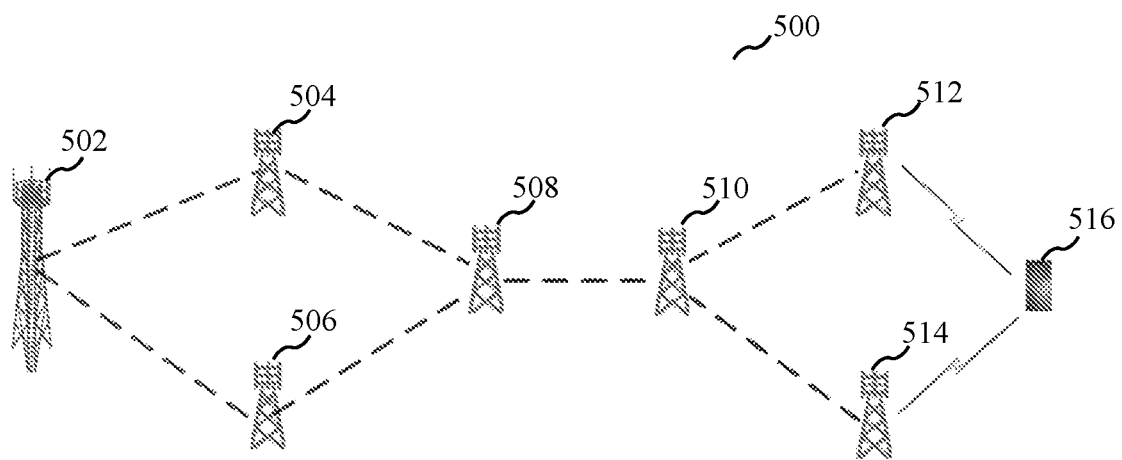
FIG. 5 illustrates an exemplary IAB system using duplication mechanism in a communication scenario according to an embodiment of the present disclosure.

FIG. 5 illustrates an exemplary IAB system 500 in scenario 1 according to an embodiment of the present disclosure.

As shown in FIG. 5, the exemplary IAB system 500 in scenario 1 can include a donor node 502, a plurality of IAB nodes 504, 506, 508, 510, 512 and 514, and a UE 516. The UE 516 may communicate with the donor node 502 via a dual connectivity, for example, a first path by accessing IAB node 512, then to IAB nodes 510, 508, 504, and then to the donor node 502; and a second path by accessing IAB node 514, then to IAB nodes 510, 508 and 506, and then to the donor node 502. Accordingly, duplication for uplink DRBs and duplication for downlink DRBs may be configured for communications between UE 516 and donor node 502. As can be seen from FIG. 5, there is only one backhaul link between IAB node 508 and IAB node 510, and the original and duplicate downlink DRBs share the single backhaul ink between IAB node 508 and IAB node 510. IAB node 508 and IAB node 510 may receive both an original packet and its corresponding duplicate packet. It is needed to transfer the original packet and its corresponding duplicate packet through different backhaul RLC channels in the single backhaul link. Thus, IAB node 508 and IAB node 510 need to map the original and duplicate downlink packets into different backhaul RLC channels. Each backhaul RLC channel is associated with a backhaul RLC entity. That is, IAB node 508 and IAB node 510 need to map the original and duplicate downlink packets into different backhaul RLC entities. Also, IAB node 508 and IAB node 510 need to map the original and duplicate uplink packets into different backhaul RLC entities.

According to an embodiment of the present disclosure, donor node 502 may configure UE 516 and all IAB nodes for duplication by RRC signaling.

Donor node 502 may perform the following configurations associated with duplication for downlink transmissions for UE 516:

Configuring a first logical channel associated with a first RLC entity in UE 516 to receive packets associated with a first downlink DRB from IAB node 512; and Configuring a second logical channel associated with a second RLC entity in UE 516 to receive packets associated with a second downlink DRB from IAB node 514.

The first RLC entity and the second RLC entity are associated with the same receiving PDCP entity in UE 516. Accordingly, packets received by the first RLC entity and the second RLC entity will be delivered to the same receiving PDCP entity.

Donor node 502 may perform the following configurations associated with duplication for uplink transmissions for UE 516:

Configuring a third logical channel associated with a third RLC entity in UE 516 to transmit packets associated with a first uplink DRB to IAB node 512; and Configuring a fourth logical channel associated with a fourth RLC entity in UE 516 to transmit packets associated with a second uplink DRB to IAB node 514.

The third RLC entity and the fourth RLC entity are associated with the same transmitting PDCP entity in UE 516. Accordingly, the transmitting PDCP entity will deliver the same packet to the third RLC entity and the fourth RLC entity for transmission. For example, the transmitting PDCP entity may deliver a packet to the third RLC entity and deliver a duplicate of the packet to the fourth RLC entity.

Donor node 502 may configure the uplink and downlink DRBs to the corresponding IAB nodes. For example, the first downlink DRB is configured to IAB nodes 504, 508, 510, and 512, and the second downlink DRB is configured to IAB nodes 506, 508, 510, and 514. Multiple DRBs may be configured to one IAB node. For each IAB node, donor node 502 may configure Quality of Service (QoS) profile and final IAB node address (e.g., accessing node 512 or 514) for each DRB configured to the IAB node.

Donor node 502 may configure a bearer specific identifier (ID) for each DRB such that the IAB nodes can differentiate different DRBs. When an IAB node receives a packet including a bearer specific ID, the IAB node can identify the DRB associated with the packet based on the bearer specific ID and then perform corresponding processing.

As stated above, IAB node 508 and IAB node 510 need to map the original and duplicate downlink DRBs associated with original packets and corresponding duplicate packets into different backhaul RLC entities. Also, IAB node 508 and IAB node 510 need to map the original and duplicate uplink DRBs associated with original packets and corresponding duplicate packets into different backhaul RLC entities. To achieve this, according to an embodiment of the present disclosure, donor node 502 may configure bearer mapping associations between radio bearer associated with duplication and backhaul RLC entity for IAB node 508 and IAB node 510, and transmit the configured bearer mapping associations to IAB node 508 and IAB node 510. The configured mapping associations ensure the pair of DRBs for original packets and corresponding duplicate packets to be mapped into different backhaul RLC entities. In another embodiment, donor node 502 may configure bearer mapping associations for all the IAB nodes.

According to an alternative embodiment, donor node 502 may transmit information indicating which DRBs are configured for duplication purpose to an IAB node without specifying the bearer mapping associations for the IAB node. For example, donor node 502 may inform IAB node 508 that which two DRBs are paired for original packets and corresponding duplicate packets. Then, IAB node 508 may determine two different backhaul RLC entities for mapping the two DRBs.

In an embodiment, UE 516 may determine by itself whether to activate or deactivate duplication for an uplink DRB. For example, UE 516 may independently determine based on detected channel conditions or QoS. Alternatively, donor node 502 may configure triggering conditions for UE 516 to determine whether to activate or deactivate duplication. When the configured triggering conditions are satisfied, UE 516 activates or deactivates duplication accordingly.

The configured triggering conditions for activating duplication may include at least one of the following conditions that:

(1) a channel quality (e.g., Reference Signal Receiving Power (RSRP)) detected by UE 516 is worse than a configured threshold;

(2) a bit rate of the DRB is less than a configured threshold;

(3) a block error ratio of the DRB is greater than a configured threshold; or (4) a number of negative acknowledgements received for uplink transmissions within a duration reaches a configured threshold.

The configured triggering conditions for deactivating duplication may include at least one of the following conditions that:

(1) a channel quality (e.g., RSRP) detected by UE 516 is better than a configured threshold;

(2) a bit rate of the DRB is greater than a configured threshold;

(3) a block error ratio of the DRB is less than a configured threshold; or (4) a number of acknowledgements received for uplink transmissions within a duration reaches a configured threshold.

All the above thresholds can be respectively and independently determined by donor node 502.

The accessing node (e.g., IAB node 512 or 514) of UE 516 can detect the quality of the backhaul channel between the accessing node and its parent node (e.g., IAB node 510), and also can obtain information regarding the quality of the channel between the accessing node and UE 516 based on RLC/MAC feedback. In an alternative embodiment, an accessing node (e.g., IAB node 512 or 514) of UE 516 may be configured by donor node 502 to be responsible for determining whether to activate or deactivate duplication. Also, the accessing node determines based on triggering conditions configured by donor node 502. Once the accessing node makes a determination, it will send a command to UE 516 to activate or deactivate duplication accordingly.

The configured triggering conditions for activating duplication may include at least one of the following conditions that:

(1) a channel quality (e.g., RSRP) detected by the accessing node is worse than a configured threshold;

(2) a bit rate of the DRB between UE 516 and the accessing node is less than a configured threshold;

(3) a block error ratio of the DRB between UE 516 and the accessing node is greater than a configured threshold; or (4) a number of negative acknowledgements received for uplink transmissions within a duration is larger than a configured threshold.

The configured triggering conditions for deactivating duplication may include at least one of the following conditions that:

(1) a channel quality (e.g., RSRP) detected by the accessing node is better than a configured threshold;

(2) a bit rate of the DRB between UE 516 and the accessing node is greater than a configured threshold;

(3) a block error ratio of the DRB between UE 516 and the accessing node is less than a configured threshold; or (4) a number of acknowledgements received for uplink transmissions within a duration is larger than a configured threshold.

All the above thresholds can be respectively and independently determined by donor node 502.

Figure 6:
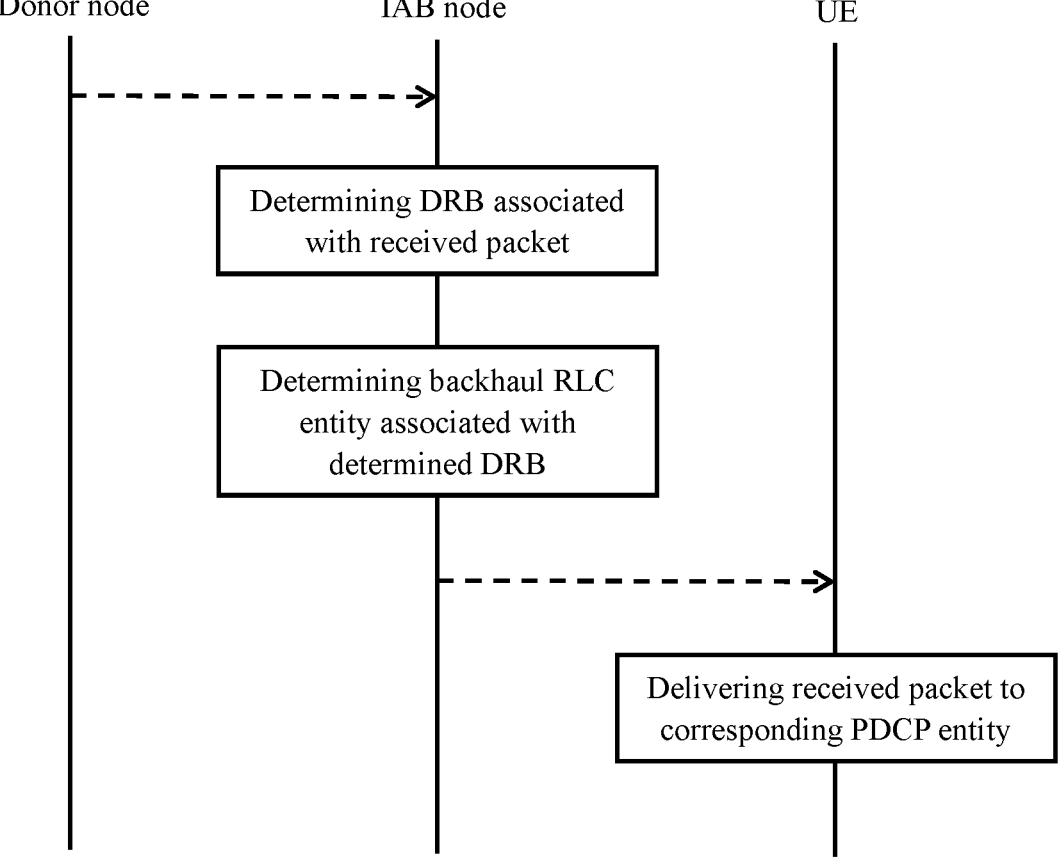
FIG. 6 illustrates an exemplary downlink transmission with duplication according to an embodiment of the present disclosure.

FIG. 6 illustrates an exemplary downlink transmission with duplication in scenario 1 according to an embodiment of the present disclosure.

As shown in FIG. 6, the donor node can respectively transmit an original packet and its corresponding duplicate packet to corresponding intermediate nodes in the original radio bearer and the duplicate radio bearer, and then the intermediate IAB nodes transmit the original packet and its corresponding duplicate packet to the UE in the original radio bearer and the duplicate radio bearer. For simplicity and clarity, only one concerned IAB node is shown in FIG. 6, which may be an intermediate IAB node or an accessing IAB node. For an IAB node receives a packet, it determines the radio bearer associated with the packet based on, for example, a UE-bearer specific ID in the packet. The IAB node then determines the backhaul RLC entity associated with the determined radio bearer based on, for example, bearer mapping associations between radio bearer associated with duplication and backhaul RLC entity configured by the donor node. In another embodiment of the present disclosure, the IAB node can also determine the backhaul RLC entity associated with the determined radio bearer based on information indicating which radio bearers are configured for duplication purpose transmitted by the donor node. The mapping principle based on the indicated information can ensure that the radio bearers for the original and duplicate packets should be mapping to the different backhaul RLC entities. The IAB node transfers the packet using the determined backhaul RLC entity to its child IAB node (if any, not shown in FIG. 6) that may perform the same operations. The child IAB node may be determined based on the final IAB node (i.e., the accessing node of the UE) address configured for each radio bearer by the donor node. The accessing node can transfer the received packet to the UE. For example, the accessing node in the original radio bearer can transfer the received original packet to the UE, while the accessing node in the duplicate radio bearer can transfer the received duplicate packet to the UE. When the RLC entity in the UE receives the packet, it delivers the packet to the corresponding PDCP entity in the UE.

Figure 7:
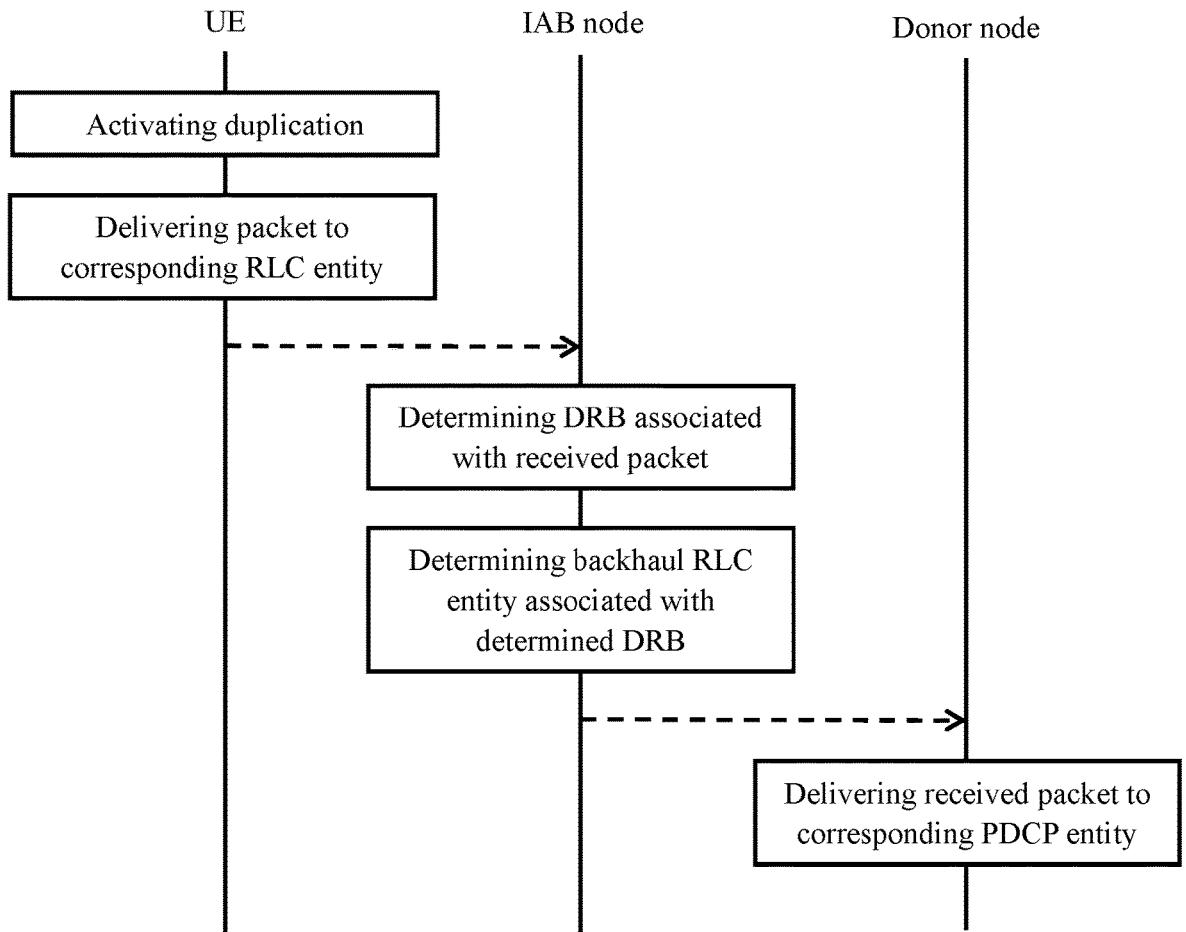
FIG. 7 illustrates an exemplary uplink transmission with duplication according to an embodiment of the present disclosure.

FIG. 7 illustrates an exemplary uplink transmission with duplication in scenario 1 according to an embodiment of the present disclosure.

As shown in FIG. 7, the UE activates duplication based on triggering conditions configured by the donor node or a command sent by an accessing node. In response to the duplication being activated, the transmitting PDCP entity in the UE respectively delivers an original packet and the corresponding duplicate packet to two different RLC entities associated with a pair of DRBs, which further respectively transmit the original and duplicate packets to two different IAB nodes (i.e., accessing nodes; only one is shown in FIG. 7 for simplicity and clarity). Once the IAB node receives a packet, it determines the DRB associated with the packet based on, for example, a UE-bearer specific ID in the packet. The IAB node then determines the backhaul RLC entity associated with the determined DRB based on, for example, bearer mapping associations configured by the donor node or information indicating which DRBs are configured for duplication purpose transmitted by the donor node, wherein two DRBs paired for original packets and corresponding duplicate packets are mapped into different backhaul RLC entities. The IAB node transfers the packet using the determined backhaul RLC entity to the next node. The next node may be determined based on the final IAB node address configured for each DRB by the donor node. The next node may be an IAB node (if any, not shown in FIG. 7) that may perform the same operations or the donor node. When the RLC entity in the donor node receives the packet, it delivers the packet to the corresponding PDCP entity.

Although the above configurations and procedures are described with respect to the exemplary IAB system 500 in scenario 1 as shown in FIG. 5, they can also be performed in other IAB systems with different structures, such as the exemplary IAB system 200 as shown in FIG. 2.

Scenario 2: Duplication Communication Between a Donor Node and an IAB Node

According to some embodiments of the present disclosure, in an exemplary scenario, duplication can only be applied to DRB between an IAB node and a donor node. That is, the terminate node of the DRB is an IAB node, which can be an accessing node of the UE or other IAB nodes. Such scenario is referred to as scenario 2 hereinafter.

Figure 8:
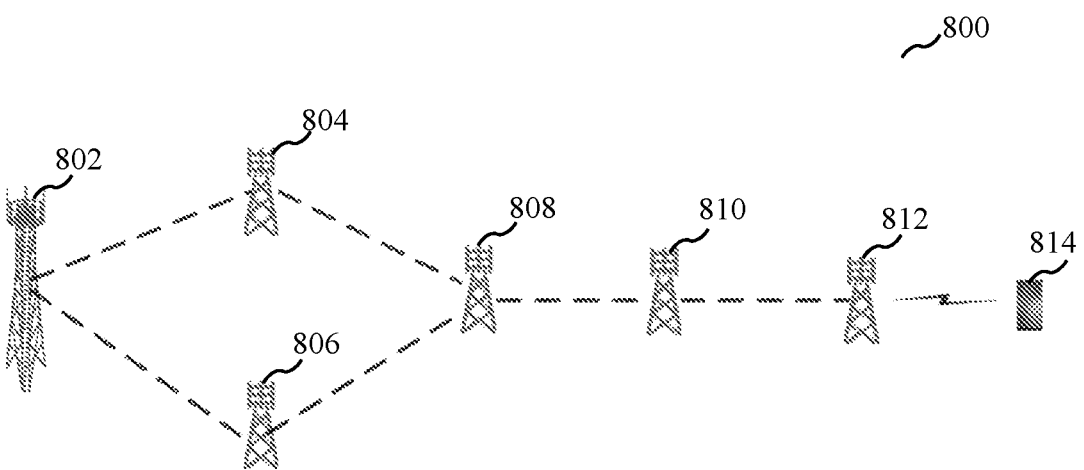
FIG. 8 illustrates an exemplary IAB system using duplication mechanism in another communication scenario according to an embodiment of the present disclosure.

FIG. 8 illustrates an exemplary IAB system 800 in scenario 2 according to an embodiment of the present disclosure. IAB system 800 includes donor node 802, multiple IAB nodes 804, 806, 808, 810, and 812, and UE 814.

Different from scenario 1, UE 814 in scenario 2 can only accesses one IAB node, i.e., IAB node 812. Thus, the duplication described above is not applicable to UE 814. Since IAB node 808 can communicate with donor node 802 via accessing IAB nodes 804 and 806 respectively, duplication transmission between donor node 802 and IAB node 808 is possible. However, as stated above, IAB node 808 does not include a CU. That is, IAB node 808 does not have a PDCP layer. Thus, the duplication procedure based on duplication of PDCP PDU (also referred to as "PDCP duplication") as illustrated in FIG. 3 and FIG. 4 cannot be performed in scenario 2.

To perform duplication in scenario 2, according to an embodiment of the present disclosure, the RLC entity in the RLC layer of the transmitting apparatus (e.g., IAB node 808) may generate an original RLC packet and a corresponding duplicate RLC packet, and deliver the original and duplicate RLC packets to RLC entities in two intermediate IAB nodes (e.g., IAB nodes 804 and 806) in the DRB between donor node 802 and the terminate node (i.e., IAB node 808), respectively. The following parameters may be added to the RLC packets in an adaptation layer of the transmitting apparatus for the receiving apparatus to determine which RLC packets are paired (i.e., one is the original packet and the other is the duplicate packet) and perform duplication detection: (1) a UE-bearer specific ID; and (2) a sequence number. Two RLC packets that are paired for duplication have the same UE-bearer specific ID and the same sequence number. Such duplication can also be referred to as "RLC duplication." The receiving apparatus can determine which two RLC packets are paired for duplication. In the case that the receiving apparatus receives both the original and duplicate packets, the receiving apparatus can discard one of them, for example the later one. The receiving apparatus needs to perform reordering of received RLC packets based on their sequence numbers when RLC duplication is applied.

According to an embodiment of the present disclosure, donor node 802 may configure the terminate IAB node (e.g., IAB node 808) and intermediate IAB nodes (e.g., IAB nodes 804 and 806) between the terminate IAB node and donor node 802 for duplication by RRC signaling.

Donor node 802 may configure the following parameters associated with duplication for downlink transmissions for the terminate IAB node (e.g., IAB node 808):

Parameters to establish a first DRB in the terminate IAB node to receive packets from a first intermediate IAB node (e.g., IAB node 804) in the down link; and Parameters to establish a second DRB in the terminate IAB node to receive packets from a second intermediate IAB node (e.g., IAB node 806) in the down link.

The first and second DRBs are associated with the same receiving RLC entity in the terminate IAB node. Accordingly, packets associated with the first and second DRBs will be delivered to the same receiving RLC entity.

Donor node 802 may configure the following parameters associated with duplication for uplink transmissions for the terminate IAB node (e.g., IAB node 808):

Parameters to establish a third DRB in the terminate IAB node to transmit packets to a first intermediate IAB node (e.g., IAB node 804) in the up link; and Parameters to establish a fourth DRB in the terminate IAB node to transmit packets to a second intermediate IAB node (e.g., IAB node 806) in the up link.

The third and fourth DRBs are associated with the same transmitting RLC entity in the terminate IAB node. Accordingly, the transmitting RLC entity will deliver the same packet to IAB nodes 804 and 806 by the third and fourth DRBs. For example, the transmitting RLC entity may deliver a packet to IAB node 804 and deliver a duplicate of the packet to IAB node 806.

Donor node 802 may configure the DRBs to the corresponding intermediate IAB nodes. For example, the first DRB is configured to IAB node 804. For each intermediate IAB node between the terminate IAB node and donor node 802, donor node 802 may configure QoS profile and final IAB node address for each DRB configured to the intermediate IAB node.

Donor node 802 may configure a UE-bearer specific ID for each DRB such that the IAB nodes can differentiate different DRBs. When an IAB node receives a packet including a UE-bearer specific ID, the IAB node can identify the DRB associated with the packet based on the UE-bearer specific ID and then perform corresponding processing.

In an embodiment, the terminate IAB node (e.g., IAB node 808) may determine by itself whether to activate or deactivate duplication for an uplink DRB. For example, IAB node 808 may independently determine based on detected channel conditions. Alternatively, donor node 802 may configure triggering conditions for IAB node 808 to determine whether to activate or deactivate duplication. When the configured triggering conditions are satisfied, IAB node 808 activates or deactivates duplication accordingly.

The configured triggering conditions for activating duplication may include at least one of the following conditions that:

(1) a channel quality (e.g., RSRP) detected by IAB node 808 is worse than a configured threshold;

(2) a bit rate of the DRB is less than a configured threshold;

(3) a block error ratio of the DRB is greater than a configured threshold; or (4) a number of negative acknowledgements received for uplink transmissions within a duration is larger than a configured threshold.

The configured triggering conditions for deactivating duplication may include at least one of the following conditions that:

(1) a channel quality (e.g., RSRP) detected by IAB node 808 is better than a configured threshold;

(2) a bit rate of the DRB is greater than a configured threshold;

(3) a block error ratio of the DRB is less than a configured threshold; or (4) a number of acknowledgements received for uplink transmissions within a duration is larger than a configured threshold.

All the above thresholds can be respectively and independently determined by donor node 802.

In an alternative embodiment of the present disclosure, an intermediate IAB node (e.g., IAB node 804 or 806) may be configured by donor node 802 to be responsible for determining whether to activate or deactivate duplication. Also, the intermediate IAB node determines based on triggering conditions configured by donor node 802. Once the intermediate IAB node makes a determination, it will send a command to the terminate IAB node (e.g., IAB node 808) to activate or deactivate duplication accordingly.

The configured triggering conditions for activating duplication may include at least one of the following conditions that:

(1) a channel quality (e.g., RSRP) detected by the intermediate IAB node is worse than a configured threshold;

(2) a bit rate of the DRB between the terminate IAB node and the intermediate IAB node is less than a configured threshold;

(3) a block error ratio of the DRB between the terminate IAB node and the intermediate IAB node is greater than a configured threshold; or (4) a number of negative acknowledgements received for uplink transmissions within a duration is larger than a configured threshold.

The configured triggering conditions for deactivating duplication may include at least one of the following conditions that:

(1) a channel quality (e.g., RSRP) detected by the intermediate IAB node is better than a configured threshold;

(2) a bit rate of the DRB between the terminate IAB node and the intermediate IAB node is greater than a configured threshold;

(3) a block error ratio of the DRB between the terminate IAB node and the intermediate IAB node is less than a configured threshold; or (4) a number of acknowledgements received for uplink transmissions within a duration is larger than a configured threshold.

All the above thresholds can be respectively and independently determined by donor node 802.

Figure 9:
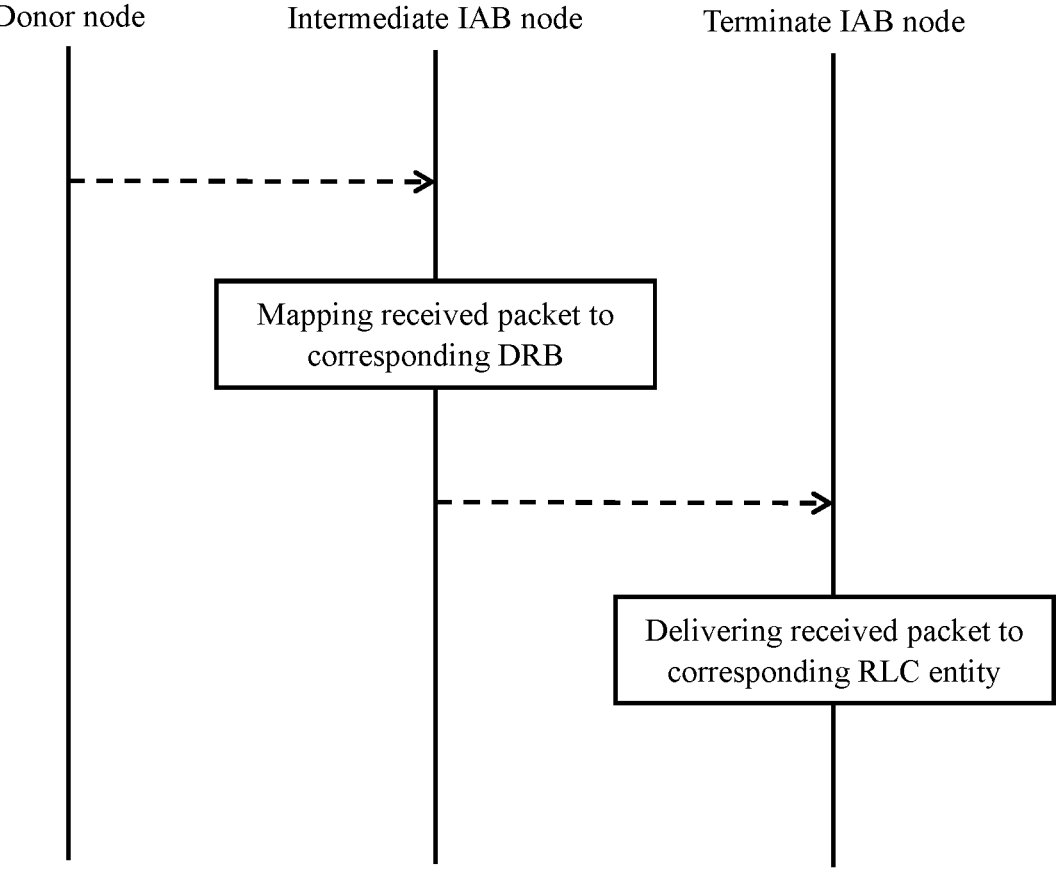
FIG. 9 illustrates an exemplary downlink transmission to a terminate IAB node with duplication according to an embodiment of the present disclosure.

FIG. 9 illustrates an exemplary downlink transmission to a terminate IAB node with duplication according to an embodiment of the present disclosure.

As shown in FIG. 9, the donor node respectively transmits an original packet and the corresponding duplicate packet to two different intermediate IAB nodes (only one is shown in FIG. 9 for simplicity and clarity) associated with a pair of DRBs. Once the intermediate IAB node receives a packet, it maps the packet to a corresponding DRB based on, for example, a UE-bearer specific ID in the packet, and transfers the packet to the next IAB node by the DRB. The next IAB node may be another intermediate IAB node (if any, not shown in FIG. 9) that may perform the same operations or the terminate IAB node. When the RLC entity in the terminate IAB node receives the packet, it delivers the packet to a corresponding RLC entity in the next node (e.g., IAB node 810 in FIG. 8).

Figure 10:
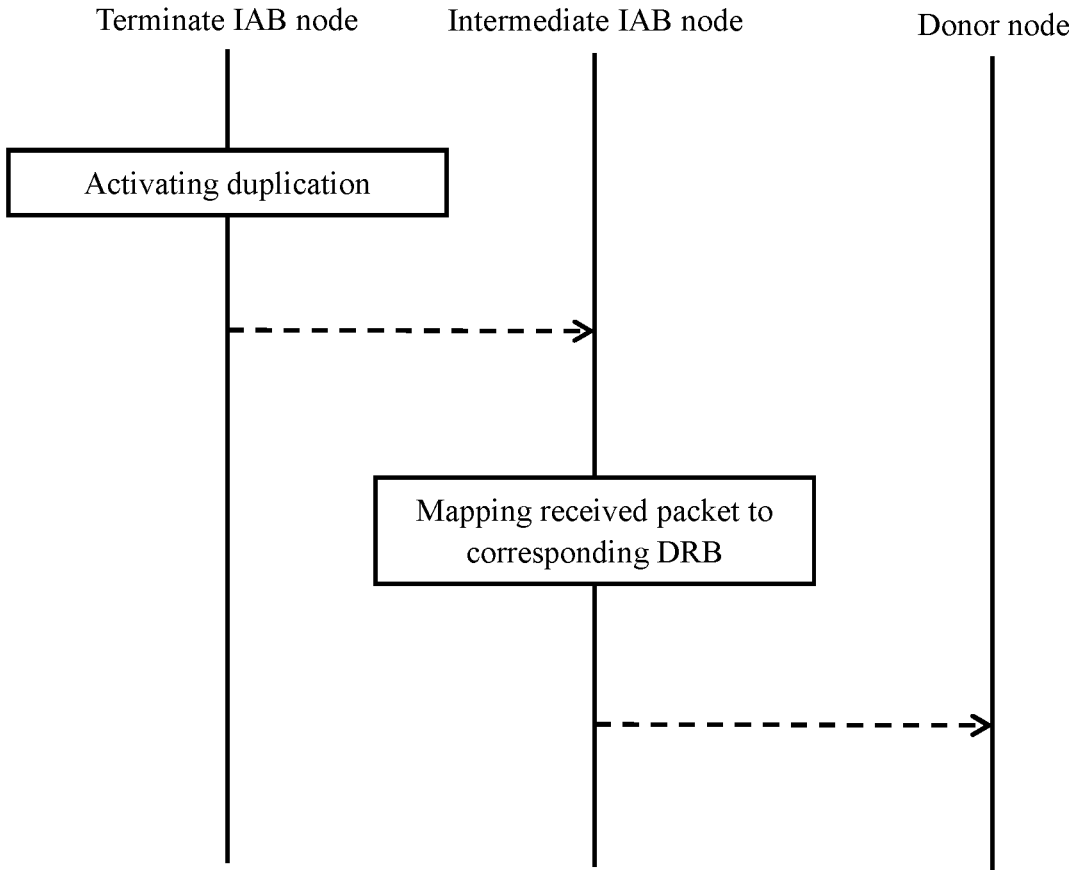
FIG. 10 illustrates an exemplary uplink transmission from a terminate IAB node with duplication according to an embodiment of the present disclosure.

FIG. 10 illustrates an exemplary uplink transmission from a terminate IAB node with duplication according to an embodiment of the present disclosure.

As shown in FIG. 10, the terminate IAB node activates duplication based on triggering conditions configured by the donor node or a command sent by an intermediate IAB node between the donor node and the terminate IAB node. In response to the duplication being activated, the transmitting RLC entity in the terminate IAB node respectively delivers an original packet and the corresponding duplicate packet to two different intermediate IAB nodes (only one is shown in FIG. 10 for simplicity and clarity) associated with a pair of DRBs. Once the intermediate IAB node receives a packet, it maps the packet to a corresponding DRB based on, for example, a UE-bearer specific ID in the packet, and transfers the packet to the next IAB node by the DRB. The next IAB node may be another intermediate IAB node (if any, not shown in FIG. 10) that may perform the same operations or the donor node.

Although the above configurations and procedures are described with respect to the exemplary IAB system 800 in scenario 2 as shown in FIG. 8, they can also be performed in other IAB systems with different structures.

Figure 11:
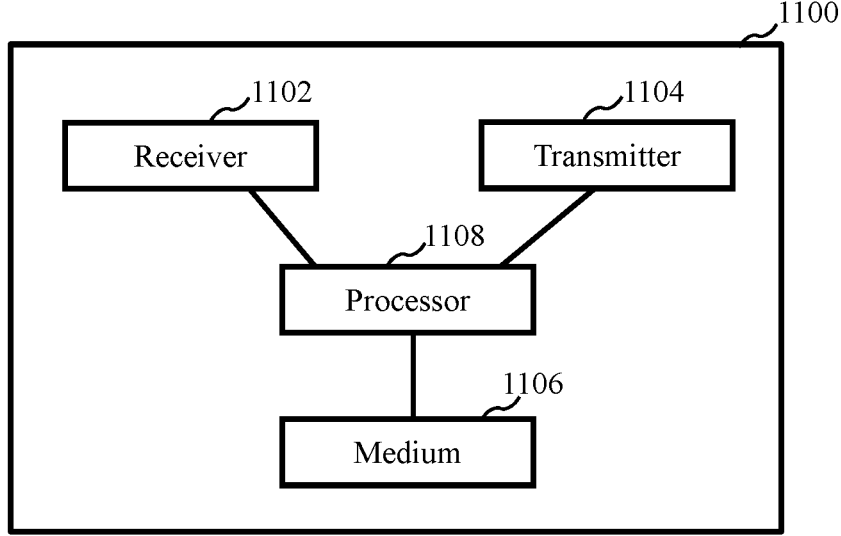
FIG. 11 illustrates an exemplary block diagram of an apparatus according to an embodiment of the present disclosure.

FIG. 11 illustrates an exemplary block diagram of an apparatus 1100 according to an embodiment of the present disclosure.

As shown in FIG. 11, the apparatus 1100 may include a receiver 1102, a transmitter 1104, a non-transitory computer-readable medium 1106, and a processor 1108 coupled to the receiver 1102, the transmitter 1104, and the non-transitory computer-readable medium 1106. In some embodiments of the present disclosure, the apparatus 1100 is a donor node. In some other embodiments of the present disclosure, the apparatus 1100 is an IAB node or a UE.

Although in FIG. 11, elements such as receiver 1102, transmitter 1104, non-transitory computer-readable medium 1106, and processor 1108 are described in the singular, the plural is contemplated unless limitation to the singular is explicitly stated. In some embodiments of the present disclosure, the receiver 1102 and the transmitter circuitry 1104 are combined into a single device, such as a transceiver. In certain embodiments of the present disclosure, the apparatus 1100 may further include an input device, a memory, and/or other components.

In some embodiments of the present disclosure, the non-transitory computer-readable medium 1106 may have stored thereon computer-executable instructions which are programmed to implement the steps of the method as described above with the receiver 1102, the transmitter 1104, and the processor 1108.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While the present disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the independent claims. Accordingly, the embodiments herein are intended to be illustrative, not limiting. Various changes may be made without departing from the spirit and scope of the present disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by a child integrated access and backhaul (IAB) node, the method comprising:

receiving configuration information associated with duplication for a data radio bearer between a user equipment (UE) and a parent IAB node; and in response to the duplication for the data radio bearer being activated:

receiving a set of original packets and a set of duplicate packets in uplink from the UE;

determining at least two data radio bearers associated with the set of original packets and the set of duplicate packets, wherein the set of original packets is associated with a first data radio bearer of the at least two data radio bearers and the set of duplicate packets is associated with a second data radio bearer of the at least two data radio bearers;

determining at least one backhaul radio link control (RLC) entity associated with each data radio bearer of the at least two data radio bearers; and transmitting the set of original packets and the set of duplicate packets in uplink to the parent IAB node using the at least one backhaul RLC entity associated with each data radio bearer of the at least two data radio bearers.

2. The method of claim 1, wherein the configuration information comprises bearer mapping associations between a radio bearer and a duplication and backhaul radio link control entity.

3. The method of claim 2, wherein a radio bearer associated with the set of original packets and a radio bearer associated with the set of duplicate packets are mapped into different backhaul radio link control entities.

4. The method of claim 1, wherein the configuration information comprises mapping information indicating radio bearers configured for the duplication.

5. The method of claim 4, wherein radio bearers for the set of original packets and the set of duplicate packets are mapped into different backhaul radio link control entities.

6. The method of claim 1, further comprising:

determining whether to activate or deactivate the duplication for a data radio bearer based on configured triggering conditions.

7. The method of claim 6, wherein the method is performed in the UE, and the configured triggering conditions for activating the duplication for data radio bearer comprise one or more of:

a channel quality detected by the UE is worse than a first threshold;

a bit rate of the data radio bearer is less than a second threshold;

a block error ratio of the data radio bearer is greater than a third threshold; or a number of negative acknowledgements received for uplink transmissions within a duration reaches a fourth threshold.

8. The method of claim 6, wherein the method is performed in the UE, and the configured triggering conditions for deactivating the duplication for data radio bearer comprise one or more of:

a channel quality detected by the UE is better than a first threshold;

a bit rate of the data radio bearer is greater than a second threshold;

a block error ratio of the data radio bearer is less than a third threshold; or a number of acknowledgements received for uplink transmissions within a duration reaches a fourth threshold.

9. The method of claim 6, wherein the method is performed in an accessing node of the UE, and the configured triggering conditions for activating the duplication for data radio bearer comprise one or more of:

a channel quality detected by the accessing node is worse than a first threshold;

a bit rate of the data radio bearer between the UE and the accessing node is less than a second threshold;

a block error ratio of the data radio bearer between the UE and the accessing node is larger than a third threshold; or a number of negative acknowledgements received for uplink transmissions within a duration is larger than a fourth threshold.

10. The method of claim 6, wherein the method is performed in an accessing node of the UE, and the configured triggering conditions for deactivating the duplication for data radio bearer comprise one or more of:

a channel quality detected by the accessing node is better than a first threshold;

a bit rate of the data radio bearer between the UE and the accessing node is greater than a second threshold;

a block error ratio of the data radio bearer between the UE and the accessing node is less than a third threshold; or a number of acknowledgements received for uplink transmissions within a duration is larger than a fourth threshold.

11. The method of claim 1, wherein the configuration information comprises parameters to establish:

first and second radio bearers to respectively transmit the set of original packets and the set of duplicate packets in the uplink, wherein the first and second radio bearers are associated with the same transmitting radio link control entity in the UE.

12. The method of claim 1, further comprising:

determining whether to activate or deactivate the duplication for data radio bearer based on configured triggering conditions.

13. The method of claim 12, wherein the method is performed in an intermediate node between the UE and the parent IAB node, and the configured triggering conditions for activating the duplication for data radio bearer comprise one or more of:

a channel quality detected by the intermediate node is worse than a first threshold;

a bit rate of the data radio bearer between the UE and the intermediate node is less than a second threshold;

a block error ratio of the data radio bearer between the UE and the intermediate node is greater than a third threshold; or a number of negative acknowledgements received for uplink transmissions within a duration is larger than a fourth threshold.

14. The method of claim 12, wherein the method is performed in an intermediate node between the UE and the parent IAB node, and the configured triggering conditions for deactivating the duplication for data radio bearer comprise one or more of:

a channel quality detected by the intermediate node is better than a first threshold;

a bit rate of the data radio bearer between the UE and the intermediate node is greater than a second threshold;

a block error ratio of the data radio bearer between the UE and the intermediate node is less than a third threshold; or a number of acknowledgements received for uplink transmissions within a duration is larger than a fourth threshold.

15. A method performed by a parent integrated access and backhaul (IAB) node, the method comprising:

transmitting, to a child IAB node, configuration information associated with duplication for a data radio bearer between a user equipment (UE) and the parent IAB node; and in response to the duplication for the data radio bearer being activated, receiving a set of original packets and a set of duplicate packets in uplink from the child IAB node using at least one backhaul radio link control (RLC) entity associated with at least two data radio bearers that are associated with a set of original packets and a set of duplicate packets, wherein the set of original packets is associated with a first data radio bearer of the at least two data radio bearers and the set of duplicate packets is associated with a second data radio bearer of the at least two data radio bearers.

16. A child integrated access and backhaul (IAB) node, comprising:

at least one memory; and at least one processor coupled with the at least one memory and configured to cause the child IAB node to:

receive configuration information associated with duplication for a data radio bearer between a user equipment (UE) and a parent IAB node; and in response to the duplication for the data radio bearer being activated:

receive a set of original packets and a set of duplicate packets in uplink from the UE;

determine at least two data radio bearers associated with the set of original packets and the set of duplicate packets, wherein the set of original packets is associated with a first data radio bearer of the at least two data radio bearers and the set of duplicate packets is associated with a second data radio bearer of the at least two data radio bearers;

determine at least one backhaul radio link control (RLC) entity associated with each data radio bearer of the at least two data radio bearers; and transmit the set of original packets and the set of duplicate packets in uplink to the parent IAB node using the at least one backhaul RLC entity associated with each data radio bearer of the at least two data radio bearers.

17. A parent integrated access and backhaul (IAB) node, comprising:

at least one memory; and at least one processor coupled with the at least one memory and configured to cause the parent IAB node to:

transmit, to a child IAB node, configuration information associated with duplication for a data radio bearer between a user equipment (UE) and the parent IAB node; and in response to the duplication for the data radio bearer 5 being activated, receive a set of original packets and a set of duplicate packets in uplink from the child IAB node using at least one backhaul radio link control (RLC) entity associated with at least two data radio bearers that are associated with a set of original 10 packets and a set of duplicate packets, wherein the set of original packets is associated with a first data radio bearer of the at least two data radio bearers and the set of duplicate packets is associated with a second data radio bearer of the at least two data radio 15 bearers.

* * * * *